United States Patent
Williams et al.

(10) Patent No.: US 6,345,008 B1
(45) Date of Patent: Feb. 5, 2002

(54) FAST REPROGRAMMABLE FIFO STATUS FLAGS SYSTEM

(75) Inventors: Kenneth L. Williams, Sherman; Rakesh N. Joshi, McKinney, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/634,449

(22) Filed: Aug. 8, 2000

(51) Int. Cl.[7] ................................................. G11C 7/00
(52) U.S. Cl. .................... 365/221; 365/189.07; 365/236
(58) Field of Search ........................... 365/221, 189.07, 365/236

(56) References Cited

U.S. PATENT DOCUMENTS

| | | | | |
|---|---|---|---|---|
| 5,084,841 A | * | 1/1992 | Williams et al. ....... | 365/189.07 |
| 5,097,442 A | * | 3/1992 | Ward et al. ................... | 365/78 |
| 5,151,999 A | * | 9/1992 | Marzucco et al. .......... | 395/800 |
| 5,365,485 A | * | 11/1994 | Ward et al. ................. | 365/221 |
| 6,044,416 A | * | 3/2000 | Hasan ........................ | 710/52 |

* cited by examiner

Primary Examiner—Richard Elms
Assistant Examiner—Tuan T. Nguyen
(74) Attorney, Agent, or Firm—Dwight N. Holmbo; Wade James Brady, III; Frederick J. Telecky, Jr.

(57) ABSTRACT

A reprogrammable FIFO status flags system for determining the status of a FIFO memory having a storage capacity (depth) D generates a pair of FIFO status flags, PAF (Programmable Almost Full) and PAE (Programmable Almost Empty) that can be reprogrammed multiple times, even after FIFO writes and reads have occurred. Two offset values ('N' and 'M') are programmed into the FIFO. PAE is high only when the number of words stored in the FIFO equals N or fewer. PAF is high only when the number of words stored in the FIFO equals D minus M or more.

28 Claims, 7 Drawing Sheets

FAST REPROGRAMMABLE FIFO STATUS FLAGS SYSTEM

BACKGROUND OF THE INVENTION

1. Field of the Invention

This invention relates generally to FIFO memories, and more particularly to a fast reprogrammable FIFO status flags system.

2. Description of the Prior Art

Technology continues to provide data processing and communication devices that transmit and process data at ever increasing speeds. In order to accommodate this increased data transmission and data processing speeds, there is a need to provide a fast reprogrammable FIFO status flags system. These status flags should be capable of switching in a short amount of time and should be capable of being reprogrammed in a short amount of time subsequent to FIFO write and read operations.

Most, if not all, stand-alone FIFO memories produced today employ status flag outputs which indicate the degree of "fullness" or number of data words stored relative to the maximum FIFO capacity. Most of these FIFOs are equipped with one or more programmable status flags, which the user can program to detect specific numbers of stored words. In view of the changing data communication technology, there is a need for a pair of these status flags which can switch in a short amount of time relative to an external clock and that can be reprogrammed multiple times, even after FIFO writes and reads have occurred, as stated above.

U.S. Pat. No. 5,084,841, entitled Programmable Status Flag Generator FIFO Using Gray Code, issued Jan. 28, 1992 to Williams, et al., and assigned to the assignee of the present invention, discloses generating programmable status flags by comparing various gray-code write and read counter outputs and using those compare results to set and reset some latches which then become the status flag outputs. U.S. Pat. No. 5,084,841 is incorporated by reference herein in its entirety. The technique disclosed by the '841 patent provides for reprogramming the status flag outputs subsequent to a reset operation. To further accommodate the foregoing discussed increased data transmission and data processing speeds, it would be advantageous if the programmable FIFO status flag technique could allow reprogramming of status flag outputs an unlimited number of times subsequent to FIFO writes and reads.

Other known techniques that accommodate programming FIFO status flags use binary write and read counters preset to fixed values, and then subtract one count from the other. The resulting difference is compared to values stored in user-programmable registers; and the compare results become the status flags. Propagation delays to the flag outputs for such systems include the delay through the subtraction logic and additional delays associated with filtering out glitches caused by multiple counter outputs switching in the same cycle. These other known techniques therefore suffer from undesirable and disadvantageous propagation delays.

In view of the foregoing, there is a need for a fast reprogrammable FIFO status flags system that is capable of being reprogrammed an unlimited number of times, even after FIFO writes and reads have occurred, and that has inherent propagation delay times substantially shorter than that associated with known systems.

SUMMARY OF THE INVENTION

The present invention is directed to a fast reprogrammable FIFO status flags system that is capable of being reprogrammed an unlimited number of times, even after FIFO writes and reads have occurred, and that has inherent propagation delay times substantially shorter than that associated with known systems. According to one embodiment, the reprogrammable FIFO status flags system includes a FLAG_GEN block, a WRITE/READ OFFSETS block and an OFFSET_GEN block. The FLAG_GEN block generates signals PAE (programmable almost empty) and PAF (programmable almost full). Two offset values ('N' and 'M') are programmed into the FIFO. PAE is high only when the number of words stored in the FIFO equals N or fewer. PAF is high only when the number of words stored in the FIFO equals D minus M or more where D is the FIFO depth, e.g. 4096 words. Read and write counter values are incremented using a gray-code sequence in which only one bit is different between any two consecutive states to prevent comparator decoding glitches. Propagation delays associated with write and read clocks are determined by certain gate times, write or read register switching times, comparator speeds and gate latching speeds without the need to use subtractors to detect differences between read and write counter values.

In one aspect of the invention, a method and associated system are implemented to allow reprogramming of N and M offset values, even after writes and/or reads have been performed. If reprogramming the offsets causes a different state on PAE or PAF, the new state is calculated at the time of reprogramming and the flag output updated.

In still another aspect of the invention, a method and associated structure are implemented using a simple binary subtracter to calculate a new flag state, thereby eliminating the need to use gray-code.

In yet another aspect of the invention, a method and associated structure are implemented using a combination of gates, read/write register, comparators and latch gates to eliminate the need for subtracters to detect differences between read and write counters.

Still another aspect of the invention is associated with a system and method implemented to provide a pair of status flags which switch in a short amount of time relative to an external clock and that can be reprogrammed multiple times, even after FIFO writes and reads have occurred.

BRIEF DESCRIPTION OF THE DRAWINGS

Other aspects and features of the present invention and many of the attendant advantages of the present invention will be readily appreciated as the same become better understood by reference to the following detailed description when considered in connection with the accompanying drawings in which like reference numerals designate like parts throughout the figures thereof and wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1:
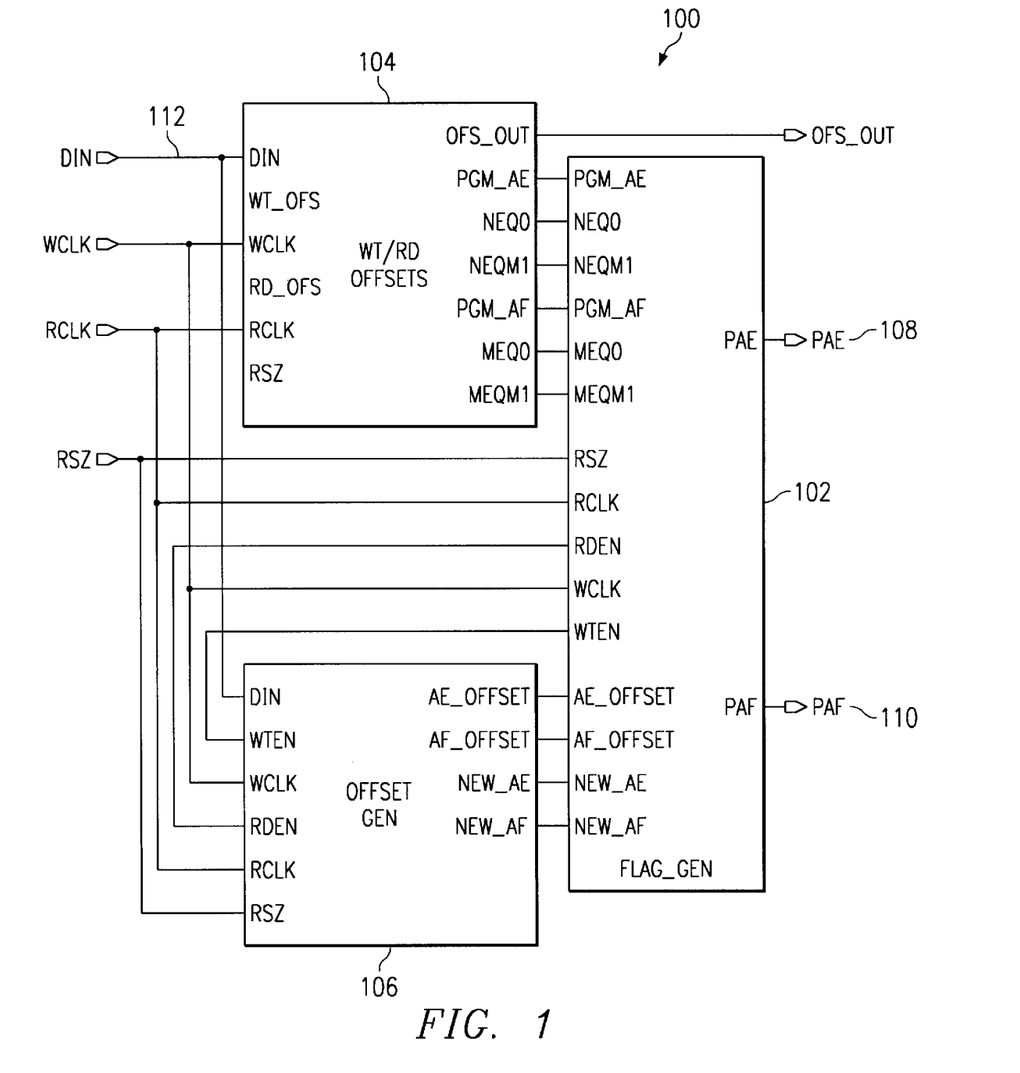
FIG. 1 is a simplified high level block diagram illustrating a fast, reprogrammable FIFO status flags system having a flags generator, an offset read/write logic, and an offset generator, according to one embodiment of the present invention.

FIG. 1 is a simplified high level block diagram illustrating a fast, reprogrammable FIFO status flags system 100 having a flags generator (FLAG_GEN) 102, an offset read/write logic (WT/RD OFFSET) 104, and an offset generator (OFFSET_GEN) 106, according to one embodiment of the present invention. FLAG_GEN 102 generates signals PAE (Programmable Almost Empty) 108 and PAF (Programmable Almost Full) 110. Two offset values ('N' and 'M') are programmed into the FIFO status flags system 100 through input bus DIN 112. PAE 108 is high only when the number of words stored in the FIFO status flags system 100 equals N or fewer. PAF 110 is high only when the number of words stored in the FIFO status flags system 100 equals D minus M or more where D is the FIFO depth which, according to one embodiment, is 4096 words.

Figure 2A:
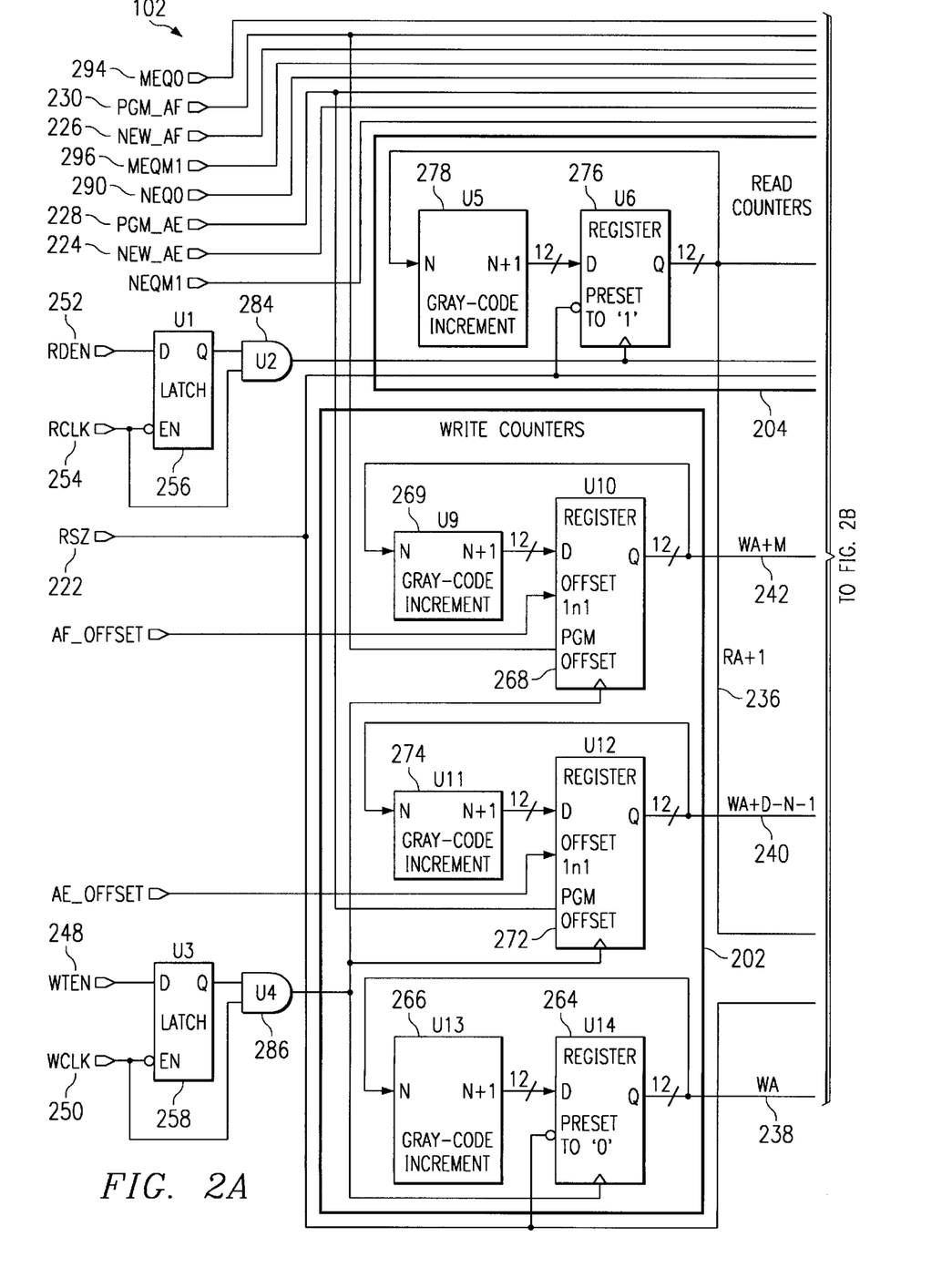
FIG. 2 is a schematic diagram illustrating in more detail, the flags generator shown in FIG. 1.
Figure 2B:
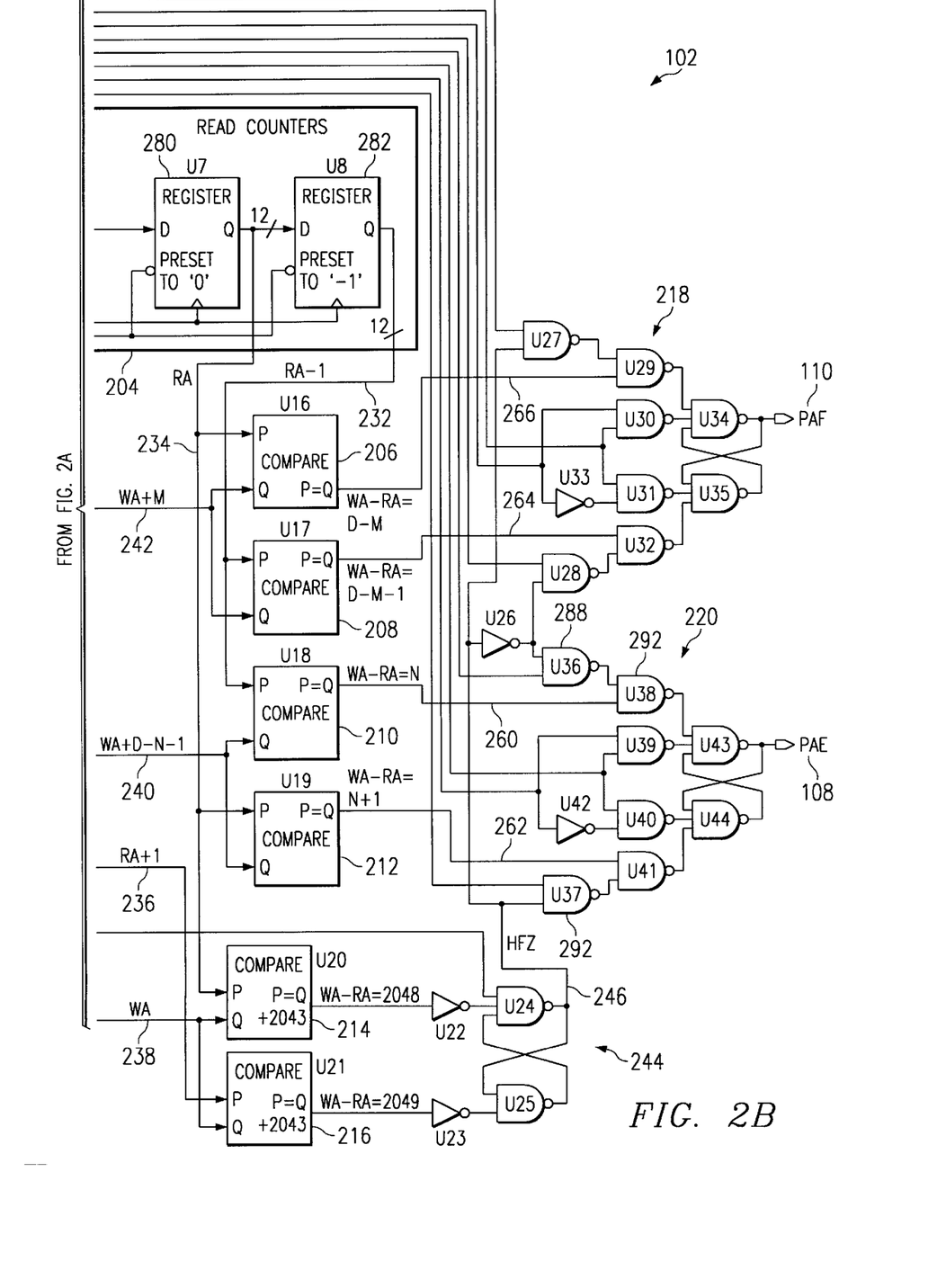

FIG. 2 is a schematic diagram illustrating in more detail, the flags generator (FLAG_GEN) 102 shown in FIG. 1. FLAG_GEN 102 includes primarily a write counter section 202, a read counter section 204, some counter comparators (U16–U21) 206–216, and a pair of cross-coupled latches 218, 220. Although a FIFO using a flags generator generally employs additional circuitry to generate other fixed-value flags, only the logic required to generate PAE 108 and PAF 110 is illustrated in FIG. 2 in order to provide clarity and brevity in further describing the present invention. Upon a FIFO reset, signal RSZ 222 goes low. This places the required initial state of PAE 108 (high) on signal NEW_AE 224 and PAF 110 (low) on NEW_AF 226. Signals PGM_AE 228 and PGM_AF 230 go high at this time which sets the cross-coupled latches consisting of gates (U34, U35) 218 and (U43, U44) 220 to their proper initial state. Also during reset, the registers U6, U7 and U8 of the read counter section 204 and registers U10, U12 and U14 of the write counter section 202 are preset to their respective values as indicated by (RA−1) 232, (RA) 234, (RA+1) 236, (WA) 238, (WA+D−N−1) 240 and (WA+M) 242. According to one embodiment, the values of N and M upon reset are set to default values of 127. Further, at reset, a third latch consisting of gates (U24, U25) 244 which generates signal HFZ (NOT HALF FULL) 246 is set high. WA and RA represent the write address and the read address respectively of the FIFO. As stated herein before, WA and RA are incremented using a gray-code sequence in which only one bit is different between any two consecutive states. This prevents comparator decoding glitches which would occur with multiple counter outputs switching on the same cycle.

Figure 5:
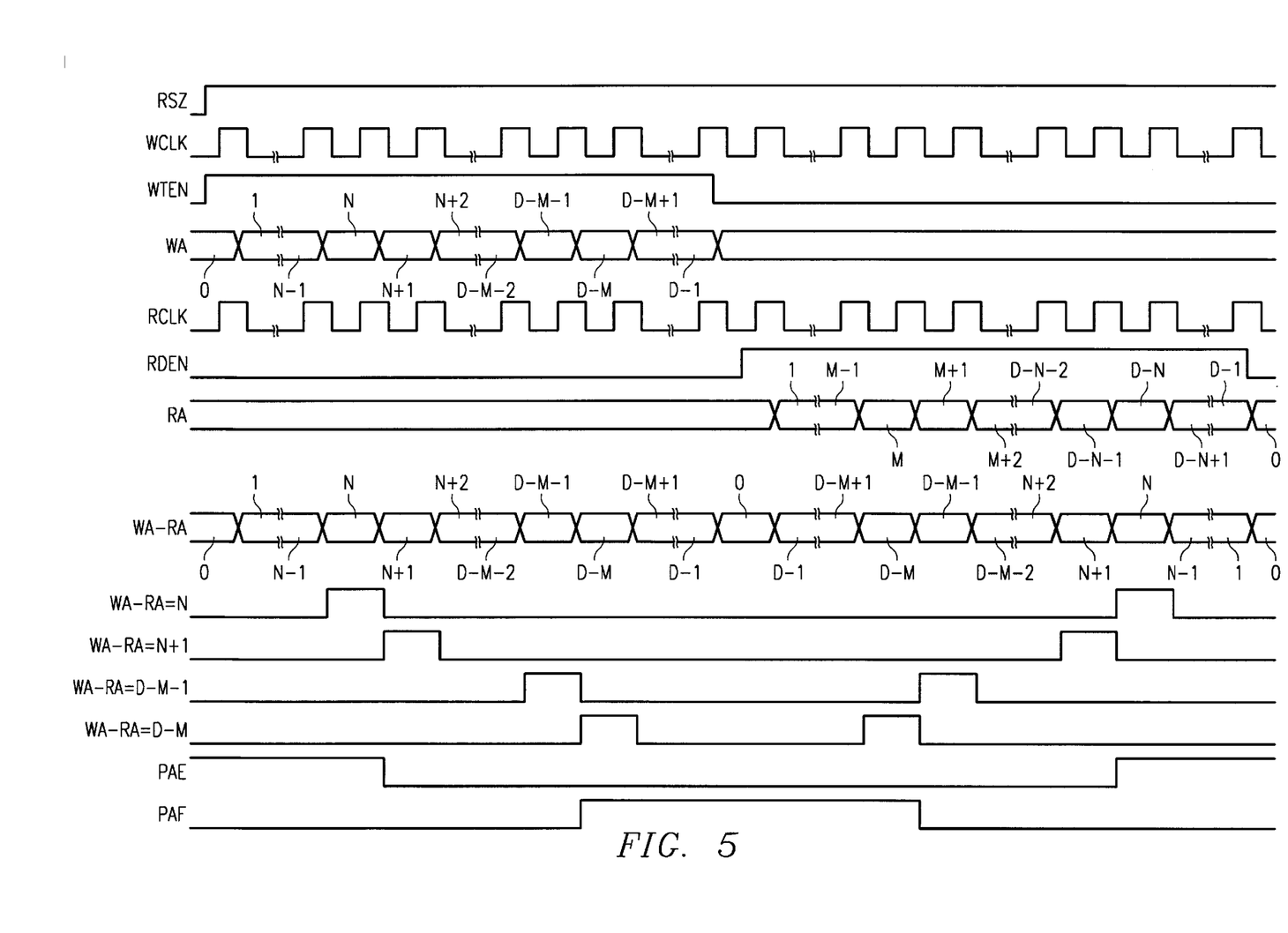
FIG. 5 is a timing diagram illustrating various flag timing relationships for the status flags system shown in FIG. 1.

Keeping the foregoing principles in mind, and starting from the initial reset condition, the values of WA and RA are both zero and the FIFO is considered empty. Signals PAE 108 and PAF 110 switch in response to specific differences between WA and RA, i.e. WA minus RA (WA−RA). A FIFO write occurs when signal WTEN 248 is high and a low-to-high transition occurs on WCLK 250. A FIFO read occurs when signal RDEN 252 is high and a low-to-high transition occurs on RCLK 254. WTEN 248 and RDEN 252 are latched in U1 (256) and U3 (258) in order to meet FIFO external set-up and hold time specifications. Starting from the reset condition, PAE 108 is high and PAF 110 low. While implementing just FIFO writes, PAE 108 switches to low when the value of WA−RA changes from N 260 to N+1 (262). As more writes occur, PAF 110 switches to high when WA−RA changes from D−M−1 (264) to D−M 266. As FIFO writes halt and reads begin, PAF 110 returns low when WA−RA changes from D−M 266 to D−M−1 (264). PAE 108 returns high when WA−RA changes from N+1 (262) to N 260. The foregoing process, illustrated in FIG. 5, is accomplished by decoding just four values of WA−RA in comparators 206–212 and using the comparator outputs to set or reset the PAE 108 and PAF 110 latches 220, 218 respectively. FIG. 5 is a timing diagram illustrating various flag timing relationships for the FIFO 100 status flags system shown in FIG. 1. The four decoded values for WA−RA are N, N+1, D−M and D−M−1, as set forth above.

The present inventors concluded that a subtractor performs much too slowly and that a glitch-free subtractor using two gray-code numbers is impractical to decode the specific values of WA−RA discussed above. Therefore, to decode the condition if WA−RA=N, the equation is first rearranged into WA−N=RA. During user programming of the flags, the values of N and M are placed on an input bus by the user. The present inventors further concluded that converting N to −N using additional logic would adversely reduce the speed of the FIFO. It can be shown however, that if all the bits of N are inverted, the value becomes D−N−1, which is the same as −N−1. Thus, WA−RA=N is rewritten as WA−N−1=RA−1, where −N−1 is calculated by inverting all the bits of N. Likewise, WA−RA=N+1 is written as WA−N−1=RA. WA−RA=D−M−1 is written as WA+D+M=RA−1 or WA+M=RA−1, since WA+D is the same as WA. WA−RA=D−M is written as WA+M=RA. Further, to generate signal HFZ 246, signals WA−RA=2048 and WA−RA=2049 are needed. Inverting the two MSBs or either WA or RA when using one chosen gray-code sequence, the equations become WA−RA=0 and WA−RA=1 or WA=RA and WA=RA+1. Therefore, to decode the required differences, the required count values to be generated are WA, WA−N−1, RA, RA+1 and RA−1. WA 238 is generated using a counter presettable to "0" that increments every time a write occurs. This counter includes register U14 (264) and incrementer U13 (266). WA+M requires a counter presettable to M, which includes register U10 (268) and incrementer U9 (270). WA−N−1 requires a counter presettable to "−N−1" and includes register U12 (272) and incrementer U11 (274). RA+1 requires a counter presettable to "1" and includes register U6 (276) and incrementer U5 (278). RA is simply the value of RA+1 delayed by one read operation and is therefore generated using a register, U7 (280). Similarly, RA−1 is generated using register U8 (282). The six compare values are decoded using comparators U16–U21 (206–216), each of whose P=Q output is high only when each bit of P equals the corresponding bit of Q.

As stated herein before, the PAE 108 and PAF 110 signals switch in a short amount of time relative to the clock inputs 250, 254. The propagation delay from either of WCLK 250 or RCLK 254 equals the time through gate U2 (284) or U4 (286), plus the time for the write or read registers 202, 204 to switch, plus the time through the comparators 206–216, plus the time through the gates of the PAE or PAF latch 220, 218. Particularly noteworthy is the absence of subtractors to detect differences between WA and RA as well as the absence of additional delay times to filter out glitches caused by decoding multiple counter outputs switching in the same cycle, such as commonly used by known FIFO architectures.

According to one embodiment, the values of N and M are allowed to range from "0" to "4095." Thus, if N is chosen as "0", signal WA−RA=N is high upon reset in which case the FIFO is empty, or any time WA=RA. Since WA ranges from "0" to "4095" however, WA=RA once again following the "4096$^{th}$" write from empty, even though the FIFO is actually full. Accordingly, if N=0 when the FIFO is not empty, signal WA−RA=N must be blocked from setting PAE 108 in order to ensure that PAE 108 functions correctly. This function occurs in gate U36 (288). If the FIFO is above half full, for example, HFZ 246 is low. Further, if N=0, then signal NEQ0 (290) is high and both inputs to U38 (292) are high so its output is low, thus blocking the effects of signal WA−RA=N (260). Similarly, if N=4095, signal WA−RA= N+1 (262) is high both when the FIFO is empty and full. When empty, HFZ 246 is high. If N=4095, signal NEQM1 224 (N=−1) is high. Therefore, both inputs to gate U37 (292) are high such that its output is low. In view of the above, when N=4095 and the FIFP 100 is empty, signal WA−RA= N+1 (262) is blocked from clearing PAE 108. A symmetrical set of circumstances occur in PAF 110 which explains the need for signals MEQ0 (294) and MEQM1 (296).

The foregoing detailed discussion associated with programming N and M assume the FIFO has just been reset and is empty. The present invention however, further advances the state of the art by also allowing reprogramming of N and M even after writes and/or reads have been performed. If reprogramming the offsets (N, M) causes a different state on PAE 108 or PAF 110, the new state is calculated at the time of reprogramming and the flag output updated.

Figure 3:
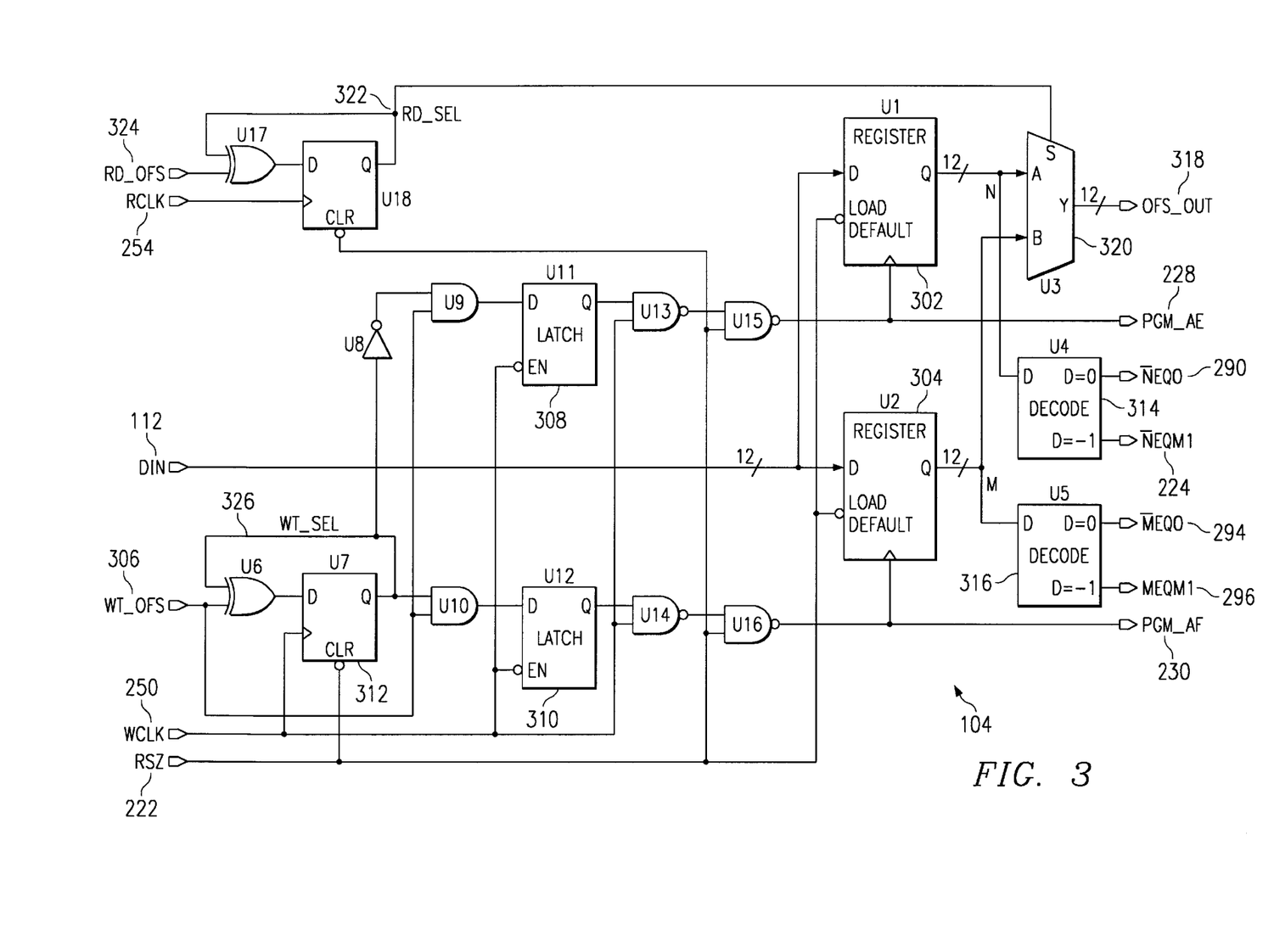
FIG. 3 is a schematic diagram illustrating in more detail, the offset read/write logic shown in FIG. 1.
Figure 6:
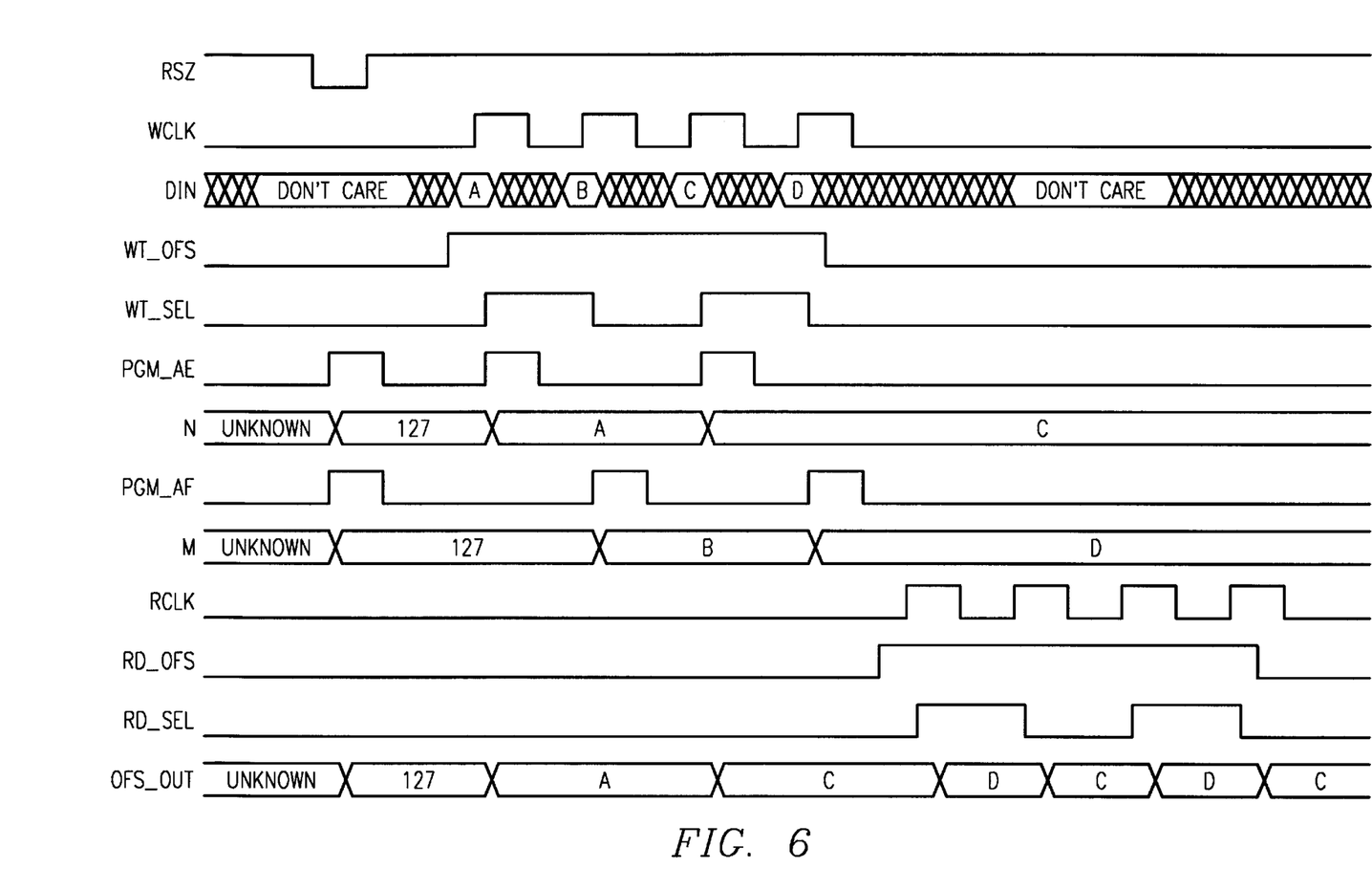
FIG. 6 is a timing diagram illustrating various timing relationships associated with reading and writing offset values necessary to generate the FIFO status flags for the system shown in FIG. 1.

FIG. 3 is a schematic diagram illustrating in more detail, the offset read/write logic 104 shown in FIG. 1, and exemplifies the logic for writing and storing the values of N and M. Offsets N and M are stored in registers U1 (302) and U2 (304). Upon a low level on RSZ 222, both registers 302, 304 are preset to a default binary value "127" according to one embodiment. At the same time, signals PGM$_B$ AE 228 and PGM_AF 230 go high which programs the two programmable write counters 268, 272 and flag latches 218, 220 to their default states. Following reset, N and M can be reprogrammed. According to one embodiment, N is programmed first, and then M. Each can be reprogrammed sequentially as often as desired. To program a new value for N or M, the desired offset value is placed on 12-bit input bus DIN 112; and signal WT_OFS (write offset) 306 is taken high. When this happens, one of the two latches (U11 and U12) 308, 310, receives a high level on its D input. With continued reference to FIG. 3, the particular latch, either 308 or 310, which receives the high level on its D input, can be seen to depend on the state of signal "WT_SEL 326." Subsequently, when WCLK 250 goes from low to high, that high value gets latched to meet the FIFO external set-up and hold requisite time specifications. One of the signals PGM_ AE 228 or PGM_AF 230 then goes high depending on which latch 308, 310 output is high. This clocks DIN 112 into the selected register 302, 304. Further, flip-flop U7 (312) toggles to its opposite state for programming the other offset on the following cycle. When WCLK 250 returns low, PGM_AE 228 or PGM_AF 230 returns low, finishing the program cycle. Decoders U4 (314) and U5 (316) detect the values of "0" or "−1" ("111111111111") on the stored offset values to generate signals NEQ0 (290), NEQM1 (224), MEQ0 (294) and MEQM1 (296) used by the PAE 108 and PAF 110 latches 220, 218. According to the current embodiment, it is desired to be able to read the stored offset values out of the FIFO. One of these stored offset values always appears on signal OFS_OUT (318) as determined by mux U3 (320) and signal RD_SEL (322). To read the other offset, signal RD_OFS (324) is taken high and RCLK (254) taken from low-to-high. This action toggles signal RD_SEL (322). Upon reset, N is the first offset to be output. The timing for writing and reading N and M is exemplified in FIG. 6.

Figure 4:
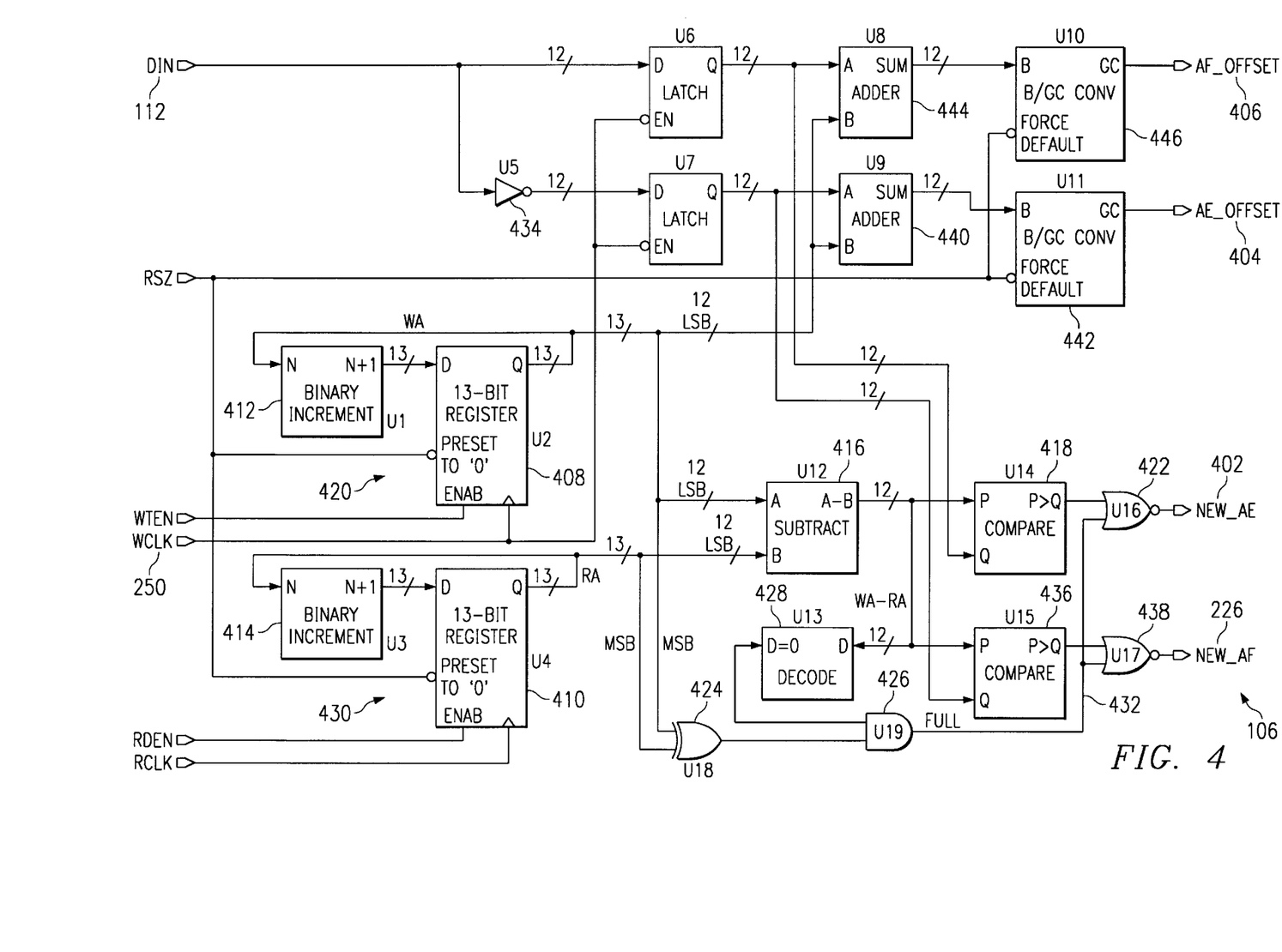
FIG. 4 is a schematic diagram illustrating in more detail, the offset generator shown in FIG. 1.

When reprogramming the offsets for PAE 108 and PAF 110, updated states for PAE 108 and PAF 110 as well as new values to be loaded into the two programmable write counters U10 (268) and U12 (272) are generated. The logic to generate these values is depicted in FIG. 4. FIG. 4 is a schematic diagram illustrating in more detail, the offset generator 106 shown in FIG. 1. The new flag values are called NEW_AE (402) and NEW_AF (226) and the new counter values are called AE_OFFSET (404) and AF_OFFSET (406). The new flag states can be derived simply by considering the descriptions of their functionality. Since the flags can be reprogrammed after FIFO writes and reads have occurred, the new flag values must consider the number of words currently stored, or WA−RA. Unlike in the flag-generation logic 102, the calculation of the new flag state can be done using binary math, and gray-code is not required. The calculation of WA−RA can thus be implemented using a simple binary subtractor. Binary values of WA and RA have not yet been generated, and are thus generated via offset generator 106 using registers U2 (408) and U4 (410) in combination with incrementers U1 (412) and U3 (414). The output of registers U2 (408) and U4 (410) retains its old value while the ENAB input is low. When ENAB is high however, the value on D gets clocked to the Q output. As explained more fully herein below, these counters 420, 430 actually generate a 13-bit binary count sequence in which only the 12 LSBs are included in most of the calculations. Subtractor U12 (416) calculates the value of WA−RA.

As stated herein before, PAE 108 is high only when the number of words stored in the FIFO equals N or fewer. In other words, PAE 108 is low when WA−RA is greater than N. During reprogramming, the desired value of N is placed on DIN 112 and latched when WCLK 250 goes high to meet FIFO set-up and hold requisite specifications. The remainder of the NEW_AE (402) calculation includes comparing the latched DIN 112 to WA−RA using a simple magnitude comparator, U14 (418). The U14 comparator 418 output is high when WA−RA is greater than DIN 112 so NOR gate U16 (422) is used to invert the output. As in the gray-code flag operation, WA−RA equals "0" both when the FIFO is empty or full. When full, PAE 108 cannot be high regardless of N, so gates U18 (424) and U19 (426) are used to detect this state and override U14 (418) output through gate U16 (422). Since the total FIFO word count equals 4096, but the WA and RA counters 420, 430 which use 13-bits can count to 8192, the FIFO is full when WA−RA=0 and the MSB of WA and RA are different. Decoder U13 (428) and gates U18 (424) and U19 (426) therefore calculate signal FULL 432.

PAF 110 is high only when the number of words stored in the FIFO equals D minus M or more where D is the FIFO depth and M is DIN 112. This can be restated as PAF 110 is high when WA−RA is greater than D minus DIN 112 minus 1. As described herein before, inverting all the bits of DIN 112 produces D−DIN−1, setting forth the need for inverter U5 (434). The inverted DIN 112 is also latched when WCLK 250 goes high and the result compared in comparator U15 (436) to WA−RA. The compare result equals the state of NEW_AF (226). For certain values of DIN 112 and WA−RA, the U15 (436) output can be low when the FIFO is actually full. Since PAF 110 is always high when the FIFO is full, signal FULL 432 is combined with U15 (436) output in gate U17 (438) to generate NEW_AF (226).

The above detailed description of the functionality of the PAE 108 write counter (U11, U12) 274, 272, with reference to FIG. 2 is equally applicable to describe generation of the AE_OFFSET signal 404. As stated above, this counter 274, 272 generates the gray-code value WA+D−N−1 (240) or WA−N−1. At the time of PAE 108 reprogramming therefore, the counter 274, 272, must be preset to this value based on the current WA and DIN 112. Since WA and N are binary values to begin with, the calculation can be done using binary math. Signal WA is available from register U2 (408). Since N equals DIN 112, D−N−1 is calculated by inverting all bits of DIN 112, as stated above. The latched value of inverted DIN 112 is added to WA in adder U9 (440) thereby producing the binary value of WA+(D−N−1). This value is converted to its gray-code equivalent in block U11 (442) to produce AE_OFFSET (404). While this value is valid, signal PGM_AE (228) in FLAG_GEN 102 is high and AE_OFFSET (404) gets loaded into register U12 (272) illustrated in FIG. 2. During a FIFO reset operation, AE_OFFSET (404) is forced to the gray-code equivalent of WA+D−N−1 or "0"+"4096"−"127"−"1" or "3968."

The above detailed description of the functionality of PAF 110 write counter (U9 and U10) 269, 268, with reference to FIG. 2 is also applicable regarding generation of the AF_OFFSET signal 406. The value WA+M is generated by adding WA to latched DIN 112 in adder U8 (444). This value is converted to its gray-code equivalent in block U10 (446). While this value is valid, PGM_AF (230) is high and AF_OFFSET (406) gets loaded into register U10 (268) shown in FIG. 2. During a FIFO reset, AF_OFFSET (406) is forced to the gray-code equivalent of "0"+"127."

In view of the above, it can be seen the present invention presents a significant advancement in the art of FIFO architecture and function as it relates to mixed signal and logic technology. A fast reprogrammable FIFO status flags system accommodates reprogramming of FIFO status flags an unlimited number of times, even after FIFO writes and reads have occurred. The present system additionally provides status flag propagation delays that are substantially smaller than delays associated with known FIFO status flag architectures, and at less expense. Further, this invention has been described in considerable detail in order to provide those skilled in the data communication art with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow. For example, although various embodiments have been presented herein with reference to particular FIFO capacities, the present inventive structures and methods are not necessarily limited to such a particular architecture or set of characteristics as used herein. The present invention could just as well be implemented using any FIFO capacity that can be manufactured with presently known manufacturing techniques.

What is claimed is:

1. A reprogrammable FIFO status flags system for determining the status of a FIFO memory having a storage capacity (depth) D, the system comprising:

a reprogrammable offset generator configured to determine a FIFO memory read address (RA) associated with a current FIFO read clock pulse and a FIFO memory write address (WA) associated with a current FIFO write clock pulse and further configured to receive a first programmable binary offset number (N) and a second programmable binary offset number (M) and therefrom update a first binary FIFO status flag signal when (WA−RA) is greater than N and update a second binary FIFO status flag signal when (WA−RA) is at least (D−M), the reprogrammable offset generator further configured to convert [WA+(D−N−1)] to a first gray code offset signal and (WA+M) to a second gray code offset signal; and a flag generator in communication with the offset generator, the flag generator having a first input configured to receive the first gray code offset signal, a second input configured to receive the second gray code offset signal, a third input configured to receive the first binary FIFO status flag signal, and a fourth input configured to receive the second binary FIFO status flag signal, and further having a first binary status flag output (PAE) and a second binary status flag output (PAF), wherein the flag generator is responsive to the first gray code offset signal, the second gray code offset signal, the first binary FIFO status flag signal, and the second binary FIFO status flag signal such that PAE and PAF can be continuously updated in response to newly programmed binary offset number values for N and M following FIFO read or write operations.

2. The FIFO status flags system according to claim 1 wherein the reprogrammable offset generator comprises a first binary sequence generator configured to generate a 13-bit binary count sequence for WA.

3. The FIFO status flags system according to claim 2 wherein the reprogrammable offset generator further comprises a second binary sequence generator configured to generate a 13-bit binary count sequence for RA.

4. The FIFO status flags system according to claim 3 wherein the reprogrammable offset generator further comprises a binary subtractor configured to determine a difference between the 12 least significant bits of the 13-bit binary count sequence for WA and the 12 least significant bits of the 13-bit binary count sequence for RA and therefrom generate (WA−RA).

5. The FIFO status flags system according to claim 1 wherein the flag generator further comprises a comparator configured to receive RA and WA+M and therefrom generate WA−RA=D−M.

6. The FIFO status flags system according to claim 5 wherein the flag generator further comprises a comparator configured to receive WA+M and RA−1 and therefrom generate WA−RA=D−M−1.

7. The FIFO status flags system according to claim 6 wherein the flag generator further comprises a plurality of logic elements configured to receive D−M and D−M−1 such that PAF can switch from low-to-high when WA−RA changes from D−M−1 to D−M and further such that PAF can switch from high-to-low when WA−RA changes from D−M to D−M−1.

8. The FIFO status flags system according to claim 1 wherein the flag generator further comprises a comparator configured to receive WA+D−N−1 and RA−1 and therefrom generate WA−RA=N.

9. The FIFO status flags system according to claim 8 wherein the flag generator further comprises a comparator configured to receive WA+D−N−1 and RA and therefrom generate WA−RA=N+1.

10. The FIFO status flags system according to claim 9 wherein the flag generator further comprises a plurality of logic elements configured to receive N and N+1 such that PAE can switch from high-to-low when WA−RA changes from N to N+1 and further such that PAE can switch from low-to-high when WA−RA changes from N+1 to N.

11. The FIFO status flags system according to claim 1 wherein the flag generator further comprises a presettable write counter configured to receive the first gray code offset signal and generate WA+M therefrom.

12. The FIFO status flags system according to claim 1 wherein the flag generator further comprises a presettable write counter configured to receive the second gray code offset signal and generate WA+D−N−1 therefrom.

13. The FIFO status flags system according to claim 1 wherein the flag generator further comprises a presettable write counter configured to generate WA in response to a system reset signal (RSZ).

14. The FIFO status flags system according to claim 1 wherein the flag generator further comprises a plurality of presettable read counters configured to generate RA+1, RA and RA−1 in response to read clock pulses.

15. A reprogrammable FIFO status flags system for determining the status of a FIFO memory having a storage capacity (depth) D, the system comprising:

means for determining a FIFO memory read address (RA) associated with a current FIFO read clock pulse;

means for determining a FIFO memory write address (WA) associated with a current FIFO write clock pulse;

means for updating a first binary FIFO status flag signal when a difference between WA and RA is greater than a most recently programmed binary offset number N;

means for updating a second binary FIFO status flag signal when a difference between WA and RA is at least equal to a difference between D and M;

means for converting WA+D−N−1 to a first gray code offset signal;

means for converting WA+M to a second gray code offset signal; and means for generating a pair of binary FIFO status flags indicative of FIFO almost full (PAF) and FIFO almost empty (PAE) status in response to the first gray code offset signal, second gray code offset signal, first binary FIFO status flag signal and second binary FIFO status signal, wherein PAE and PAF can be continuously updated in response to newly programmed binary offset number values for N and M following any FIFO read or write operation.

16. The reprogrammable FIFO status flags system according to claim 15 further comprising means for generating a 13-bit binary count sequence for WA.

17. The reprogrammable FIFO status flags system according to claim 16 further comprising means for generating a 13-bit binary count sequence for RA.

18. The reprogrammable FIFO status flags system according to claim 17 further comprising means for generating WA−RA in response to a difference between 12 least significant bits of the 13-bit binary count sequence for WA and 12 least significant bits of the 13-bit binary count sequence for RA.

19. The reprogrammable FIFO status flags system according to claim 15 further comprising means for comparing RA with WA+M and generating WA−RA=D−M therefrom.

20. The reprogrammable FIFO status flags system according to claim 19 further comprising means for comparing RA−1 with WA+M and generating WA−RA=D−M−1 therefrom.

21. The reprogrammable FIFO status flags system according to claim 20 further comprising means for switching PAF to a first logic state when WA−RA changes from D−M−1 to D−M and further for switching PAF to a second logic state when WA−RA changes from D−M to D−M−1.

22. The reprogrammable FIFO status flags system according to claim 15 further comprising means for generating WA−RA=N in response to a difference between WA+D−N−1 and RA−1.

23. The reprogrammable FIFO status flags system according to claim 22 further comprising means for generating WA−RA=N+1 in response to a difference between WA+D−N−1 and RA.

24. The reprogrammable FIFO status flags system according to claim 23 further comprising means for switching PAE to a first logic state when WA−RA changes from N to N+1 and further for switching PAE to a second logic state when WA−RA changes from N+1 to N.

25. The reprogrammable FIFO status flags system according to claim 15 further comprising means for generating WA=M in response to the first gray code offset signal.

26. The reprogrammable FIFO status flags system according to claim 15 further comprising means for generating WA+D−N−1 in response to the second gray code offset signal.

27. The reprogrammable FIFO status flags system according to claim 15 further comprising means for generating WA in response to a FIFO reset signal (RSZ).

28. The reprogrammable FIFO status flags system according to claim 15 further comprising means for generating RA+1, RA and RA−1 in response to FIFO read clock pulses.

* * * * *